(12) United States Patent
Nienhaus et al.

(10) Patent No.: US 6,903,145 B2
(45) Date of Patent: Jun. 7, 2005

(54) METHOD FOR PRODUCING A MULTICOMPONENT SYSTEM WHICH CAN BE THERMALLY HARDENED AND HARDENED BY ACTINIC RADIATION AND THE USE THEREOF

(75) Inventors: Egbert Nienhaus, Ascheberg (DE); Bernhard Lettmann, Drensteinfurt (DE)

(73) Assignee: BASF Coatings AG, Munster (DE)

( * ) Notice: Subject to any disclaimer, the term of this patent is extended or adjusted under 35 U.S.C. 154(b) by 83 days.

(21) Appl. No.: 10/363,751

(22) PCT Filed: Oct. 1, 2001

(86) PCT No.: PCT/EP01/11314

§ 371 (c)(1),
(2), (4) Date: Mar. 6, 2003

(87) PCT Pub. No.: WO02/31071

PCT Pub. Date: Apr. 18, 2002

(65) Prior Publication Data

US 2004/0097611 A1 May 20, 2004

(30) Foreign Application Priority Data

Oct. 2, 2000 (DE) .......................... 100 48 849

(51) Int. Cl.$^7$ ............... C08F 2/46; C08F 2/50
(52) U.S. Cl. ............ 522/174; 522/173; 522/174; 522/175; 522/178; 522/179; 522/182; 522/103; 522/107; 522/90; 522/91; 522/92; 522/93; 522/95; 522/97; 522/100; 522/102; 522/104; 522/106; 522/79; 522/81; 428/422.8; 428/423.1; 428/423.3
(58) Field of Search .............. 522/91, 90, 92, 522/93, 95, 97, 100, 101, 102, 104, 106, 79, 81, 83, 84, 85, 86, 170, 173, 174, 175, 178, 179, 182, 103, 107; 428/422.8, 423.1, 423.3

(56) References Cited

U.S. PATENT DOCUMENTS

| 4,342,793 | A | 8/1982 | Skinner et al. ............... 528/75 |
| 5,234,970 | A | 8/1993 | Kyle |
| 5,997,682 | A | * 12/1999 | Goodman et al. ....... 156/273.7 |
| 6,332,291 | B1 | 12/2001 | Flosbach et al. ............... 52/91 |
| 6,335,381 | B1 | 1/2002 | Hovestadt et al. |
| 6,617,413 | B1 | 9/2003 | Bruchmann et al. |
| 2003/0171449 | A1 | 9/2003 | Nienhaus et al. |

FOREIGN PATENT DOCUMENTS

| EP | 0 928 800 | 12/1998 | ........... C08G/18/81 |
| WO | WO 91/11479 | 8/1991 | ........... C08G/18/63 |
| WO | WO9955785 | * 4/1999 | ........... C09D/4/00 |
| WO | WO 99/55785 | 11/1999 | ........... C09D/4/00 |

* cited by examiner

Primary Examiner—James J. Seidleck
Assistant Examiner—Sanza L. McClendon

(57) ABSTRACT

A process for preparing a multicomponent system curable thermally and with actinic radiation (dual cure), where
(A) at least one component comprising at least one constituent (A1) containing per molecule at least two isocyanate-reactive functional groups, and
(B) one component containing one polyisocyanate (B1), are mixed with one another, which comprises mixing component (A) and/or component (B), shortly before their mixing, with one further liquid component (C) comprising
(C1) one constituent which is curable with actinic radiation and contains per molecule at least two functional groups which contain bond which can be activated with actinic radiation, and/or
(C2) one constituent which is curable thermally and with actinic radiation and contains per molecule at least one functional group which contains at least one bond which can be activated with actinic radiation, and containing per molecule at least one isocyanate-reactive functional group or containing at least one isocyanate group, and subsequently mixing and homogenizing components (A/C) and (B), (A) and (B/C) or (A/C) and (B/C).

19 Claims, No Drawings

METHOD FOR PRODUCING A MULTICOMPONENT SYSTEM WHICH CAN BE THERMALLY HARDENED AND HARDENED BY ACTINIC RADIATION AND THE USE THEREOF

CROSS REFERENCE TO RELATED APPLICATIONS

This application is a National Phase Application of Patent Application PCT/EP01/11314 filed on 1 Oct. 2001, which claims priority to DE 100 48 849.8, filed on 2 Oct. 2000.

The present invention relates to a novel process for producing a multicomponent system curable thermally and with actinic radiation. The present invention additionally relates to a novel multicomponent system curable thermally and with actinic radiation. Furthermore, the present invention relates to the use of the novel multicomponent system and/or of the multicomponent system produced in accordance with the novel process as a coating material, adhesive or sealing compound. The present invention further relates to the use of the coating materials for automotive OEM finishing, automotive refinishing, the coating of furniture, doors, windows or constructions in the interior and exterior sector, and also for industrial coating, including coil coating, container coating and the coating or impregnation of electrical components.

Here and below, actinic radiation is electromagnetic radiation such as near infrared (NIR), visible light, UV radiation or x-rays, especially UV radiation, or corpuscular radiation such as electron beams.

Among those in the art, curing with heat and actinic radiation is also referred to for short as dual cure.

A dual-cure multicomponent system is known, for example, from European Patent Application EP 0 928 800 A1. It comprises a urethane (meth)acrylate containing free isocyanate groups and (meth)acryloyl groups, a photoinitiator and an isocyanate-reactive compound, especially a polyol or polyamine. Although this dual-cure coating material offers the possibility of varying the profiles of properties of coating material and coating and of tailoring them to different end uses, its flash-off time is still too long and its initial hardness in the shadow zones of three-dimensional substrates of complex shape, which are not reached by the actinic radiation without the use of relatively complex apparatus, is too low.

Moreover, dual-cure multicomponent systems of this kind, alongside many other, non-polyisocyanate-based dual-cure multi- and mono-component systems are known from German Patent Application DE 198 18 735 A1. The advantages set out in the patent application, however, which are purportedly possessed by all of the systems described therein, stop at general indications and are not reinforced by a specific example.

The processes for preparing the known dual-cure multicomponent systems have the disadvantage that it is necessary to lay down the composition of the dual-cure multicomponent systems from the outset; subsequent variations are possible only with difficulty and may lead to a deterioration in the profile of performance properties, such that the dual-cure multicomponent systems in question are no longer suitable for a demanding utility such as automotive refinish.

Overall, the known processes are wanting in terms of the necessary breadth of variation, and flexibility. In the context of automotive refinish, for example, the thermally curable multicomponent clearcoat materials already present in a workshop have not to date been able to be formulated as dual-cure multicomponent clearcoat materials by adding components curable with actinic radiation when a sudden need arises.

It is an object of the present invention to find a new process for preparing dual-cure multicomponent systems which makes it possible, starting from conventional multicomponent systems known per se, in a simple manner to prepare dual-cure multicomponent systems of any of a very wide variety of compositions and with any of a very wide variety of amounts of bonds which can be activated with actinic radiation. Furthermore, the dual-cure multicomponent systems prepared by this procedure should have a profile of performance properties which is at least comparable with if not indeed exceeding that of dual-cure multicomponent systems prepared in a customary and known manner. In particular, the coatings produced therewith should have a high initial hardness, even in the problematic shadow zones of three-dimensional substrates of complex shape.

A further object of the present invention is to find a new dual-cure multicomponent system which does not now have the disadvantages of the prior art but which instead has a short flash-off time. Furthermore, the coatings produced therewith should have a high initial hardness, even in the problematic shadow zones of three-dimensional substrates of complex shape.

A further intention is that the new dual-cure multicomponent system and/or the dual-cure multicomponent system prepared by the new process should be suitable both as a coating material and also as an adhesive and sealing compound.

Moreover, the coating material which is new or prepared by the new process should be outstandingly suitable for automotive OEM finishing, automotive refinishing, the coating of furniture, doors, windows or constructions in the interior and exterior sector, and also for industrial coating, including coil coating, container coating and the coating or impregnation of electrical components.

The coatings, adhesive films and seals produced from the dual-cure multicomponent system prepared by the new process and/or from the new dual-cure multicomponent system should have a high scratch resistance, very good chemical, gasoline, solvent and etch resistance and also weathering stability, and should not exhibit any cracks.

The adhesive films and seals should exhibit long-term bond strength and, respectively, a long-term sealing capacity even under extreme and/or rapidly changing climatic conditions.

The coatings should further be outstandingly suitable as clearcoats as part of multicoat color and/or effect coating systems. The new clearcoats should have a high initial hardness, even in the problematic shadow zones of three-dimensional substrates of complex shape.

Accordingly, we have found the novel process for preparing a multicomponent system curable thermally and with actinic radiation (dual cure), where (A) at least one component comprising at least one constituent containing per molecule on average at least two isocyanate-reactive functional groups, and (B) at least one component comprising at least one polyisocyanate, are mixed with one another, characterized in that component (A) and/or component (B) is or are mixed, shortly before their mixing, with at least one further liquid component (C) comprising (C1) at least one constituent which is curable with actinic radiation and contains per molecule on average at least two functional groups which contain at least one bond which can be activated with actinic radiation, and/or (C2) at least one constituent which is curable thermally and with actinic radiation and contains on average per molecule at least one functional group which contains at least one bond which can be activated with actinic radiation, and containing on average per molecule at least one isocyanate-reactive functional group or containing on average at least one isocyanate group, and subsequently components (A/C) and (B), (A) and (B/C) or (A/C) and (B/C) are mixed and homogenized.

In the text below, the novel process for preparing a multicomponent system curable thermally and with actinic radiation (dual cure) is referred to as the "process of the invention".

We have also found the novel multicomponent system curable thermally and with actinic radiation (dual cure) comprising (A) at least one component comprising at least one thermally curable constituent (A1) containing per molecule on average at least two isocyanate-reactive functional groups, (B) at least one component comprising a polyisocyanate (B1), and (C) at least one reactive diluent which is curable with actinic radiation and contains per molecule at least 5 bonds which can be activated with actinic radiation, the reactive diluent (C) not being introduced by way of a thixotropic agent.

In the text below; the novel multicomponent system curable thermally and with actinic radiation (dual cure) is referred to as the "multicomponent system of the invention".

The component (A) suitable for the process of the invention and, respectively, for the multicomponent system of the invention comprises at least one constituent (A1) containing per molecule on average at least two, in particular at least three, isocyanate-reactive functional groups.

Examples of suitable isocyanate-reactive functional groups are thiol, primary or secondary amino, imino or hydroxyl groups, especially hydroxyl groups.

The constituent (A1) may be of low molecular mass, oligomeric or polymeric. Preferably it is oligomeric or polymeric.

The basic structures of the low molecular mass constituents (A1) are not critical but instead may derive from any of a very wide variety of organic compound classes. Examples of suitable classes of compound are alkyl, cycloalkyl, alkylcycloalkyl, cycloalkylalkyl, aryl, alkylaryl, cycloalkylaryl, arylalkyl and/or arylcycloalkyl compounds with or without heteroatoms such as oxygen, nitrogen, sulfur, silicon or phosphorus and optionally carrying further substituents which, however, must not react during the preparation of the constituents, their storage and/or their use with the bonds which can be activated with actinic radiation.

The basic structures of the oligomeric or polymeric constituents (A1) are likewise not critical and may derive from any of a wide variety of oligomer and polymer classes. Examples of suitable oligomer and polymer classes are random, alternating and/or block, linear and/or branched and/or comb addition (co)polymers of ethylenically unsaturated monomers, or polyaddition resins and/or polycondensation resins. Regarding these terms, reference is made for further details to Römpp Lexikon Lacke und Druckfarben, Georg Thieme Verlag, Stuttgart, N.Y., 1998, page 457, "Polyaddition" and "Polyaddition resins (polyadducts)", and also pages 463 and 464, "Polycondensates", "Polycondensation" and "Polycondensation resins". As regards any substituents which may be present, the remarks made above apply accordingly.

Examples of highly suitable addition (co)polymers (A1) are poly(meth)acrylates and partially hydrolyzed polyvinyl esters.

Examples of highly suitable polyaddition resins and/or polycondensation resins (A1) are polyesters, alkyds, polyurethanes, polylactones, polycarbonates, polyethers, epoxy resin-amine adducts, polyureas, polyamides or polyimides.

In accordance with the invention, the (meth)acrylate copolymers, especially those containing hydroxyl groups, have particular advantages and in accordance with the invention are used with particular preference as constituents (A1).

The (meth)acrylate copolymers (A1) are polymers which are known per se. Their preparation has no special features as to method but instead takes place with the aid of the methods, customary and known in the plastics field, of continuous or batchwise free-radically initiated copolymerization in bulk, solution, emulsion, miniemulsion or microemulsion under atmospheric pressure or superatmospheric pressure in stirred vessels, autoclaves, tube reactors, loop reactors or Taylor reactors at temperatures from 50 to 200° C.

Examples of suitable (meth)acrylate copolymers (A1) and copolymerization methods are described in patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 and WO 98/02466.

Their hydroxyl number is preferably 70–200, more preferably 80–170 and especially 90 or 150 mg KOH/g.

In component (A), the constituents (A1) are present in widely varying amounts. Preferably, the component comprises the constituents (A1) in an amount of from 40 to 95, more preferably from 45 to 95 and in particular from 40 to 90% by weight, based in each case on component (A).

Furthermore, component (A) of the multicomponent system may further comprise customary and known additives in effective amounts. The essential factor is that the additives do not inhibit or prevent entirely the dual-cure crosslinking reactions.

Examples of suitable additives are nanoparticles, reactive diluents curable thermally low-boiling organic solvents and high-boiling organic solvents ("long solvents"), water, UV absorbers, light stabilizers, free-radical scavengers, thermally labile free-radical initiators, photoinitiators and photocoinitiators, crosslinking agents as used in one-component systems, thermal crosslinking catalysts, devolatilizers, slip additives, polymerization inhibitors, defoamers, emulsifiers, wetting agents, dispersants, adhesion promoters, leveling agents, film-forming auxiliaries, sag control agents (SCAs), rheology control additives (thickeners), flame retardants, siccatives, dryers, antiskinning agents, corrosion inhibitors, waxes, flatting agents, precursors of organically modified ceramic materials, or additional binders.

Examples of suitable thermally curable reactive diluents are positionally isomeric diethyloctanediols or hydroxyl-containing hyperbranched compounds or dendrimers, as described for example in German Patent Applications DE 198 05 421 A1, DE 198 09 643 A1, and DE 198 40 405 A1.

Examples of suitable low-boiling organic solvents and high-boiling organic solvents ("long solvents") are ketones such as methyl ethyl ketone, methyl isoamyl ketone or methyl isobutyl ketone, esters such as ethyl acetate, butyl acetate, ethyl ethoxypropionate, methoxypropyl acetate or butyl glycol acetate, ethers such as dibutyl ether or ethylene glycol, diethylene glycol, propylene glycol, dipropylene glycol, butylene glycol or dibutylene glycol dimethyl, diethyl or dibutyl ether, N-methylpyrrolidone or xylenes or mixtures of aromatic and/or aliphatic hydrocarbons such as Solventnaphtha®, mineral spirit 135/180, dipentenes or Solvesso®.

Examples of suitable thermally labile free-radical initiators are organic peroxides, organic azo compounds or C-C-cleaving initiators such as dialkyl peroxides, peroxocarboxylic acids, peroxodicarbonates, or peroxide esters, hydroperoxides, ketone peroxides, azo dinitriles or benzpinacol silyl ethers.

Examples of suitable crosslinking catalysts are dibutyltin dilaurate, dibutyltin dioleate, lithium decanoate, zinc octoate or bismuth salts such as bismuth lactate or bismuth dimethylolpropionate.

Examples of suitable photoinitiators and coinitiators are described in Römpp Lexikon Lacke und Druckfarben, Georg Thieme Verlag, Stuttgart, 1998, pages 444 to 446.

Examples of suitable additional crosslinking agents as used in one-component systems are amino resins, as described for example in Römpp Lexikon Lacke und Druckfarben, Georg Thieme Verlag, 1998, page 29, "Amino resins", in the text book "Lackadditive" [Additives for Coatings] by Johan Bieleman, Wiley-VCH, Weinheim, N.Y., 1998, pages 242 ff., in the book "Paints, coatings and solvents", second, completely revised edition, D. Stoye and W. Freitag (eds.), Wiley-VCH, Weinheim, N.Y., 1998, pages 80 ff., in patents U.S. Pat. No. 4,710,542 A1 and EP-B-0 245 700 A1, and in the article by B. Singh and coworkers, "Carbamylmethylated Melamines, Novel Crosslinkers for the Coatings Industry" in Advanced Organic Coatings Science and Technology Series, 1991, Volume 13, pages 193 to 207; carboxyl-containing compounds or resins, as described for example in patent DE 196 52 813 A1; resins or compounds containing epoxide groups, as described for example in patents EP 0 299 420 A1, DE 22 14 650 B1, DE 27 49 576 B1, U.S. Pat. No. 4,091,048 A and U.S. Pat. No. 3,781,379 A; blocked polyisocyanates, as described for example in patents U.S. Pat. No. 4,444,954 A, DE 196 17 086 A1, DE 196 31 269 A1, EP 0 004 571 A1 and EP 0 582 051 A1; and/or tris(alkoxycarbonylamino)triazines as described in patents U.S. Pat. No. 4,939,213 A, U.S. Pat. No. 5,084,541 A, U.S. Pat. No. 5,288,865 A and EP 0 604 922 A1.

Examples of suitable devolatilizers are diazadicycloundecane and benzoin.

Examples of suitable emulsifiers are nonionic emulsifiers, such as alkoxylated alkanols, polyols, phenols and alkylphenols, or anionic emulsifiers such as alkali metal salts or ammonium salts of alkanecarboxylic acids, alkanesulfonic acids, and sulfo acids of alkoxylated alkanols, polyols, phenols and alkylphenols.

Examples of suitable wetting agents are siloxanes, fluorine compounds, carboxylic monoesters, phosphoric esters, polyacrylic acids and their copolymers, or polyurethanes.

An example of a suitable adhesion promoter is tricyclodecanedimethanol.

Examples of suitable film-forming auxiliaries are cellulose derivatives such as cellulose acetobutyrate (CAB).

Examples of suitable transparent fillers are those based on silicon dioxide, aluminum oxide or zirconium oxide; for further details, reference is made to Römpp Lexikon Lacke und Druckfarben, Georg Thieme Verlag, Stuttgart, 1998, pages 250 to 252.

Examples of suitable sag control agents are ureas, modified ureas and/or silicas, as described for example in the literature references EP 0 192 304 A1, DE 23 59 923 A1, DE 18 05 693 A1, WO 94/22968, DE 27 51 761 C1, WO 97/12945 or "farbe+lack", November 1992, pages 829 ff.

Examples of suitable rheology control additives are those known from patents WO 94/22968, EP 0 276 501 A1, EP 0 249 201 A1 and WO 97/12945; crosslinked polymeric microparticles, as disclosed for example in EP 0 008 127 A1; inorganic phyllosilicates such as aluminum-magnesium silicates, sodium-magnesium and sodium-magnesium-fluorine-lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives or hydrophobically modified ethoxylated urethanes or polyacrylates.

An example of a suitable flatting agent is magnesium stearate.

Examples of suitable precursors of organically modified ceramic materials are hydrolyzable organometallic compounds, especially of silicon and aluminum.

Further examples of the above-listed additives and also examples of suitable UV absorbers, free-radical scavengers, leveling agents, flame retardants, siccatives, dryers, anti-skinning agents, corrosion inhibitors and waxes (B) are described in detail in the textbook "Lackadditive" by Johan Bieleman, Wiley-VCH, Weinheim, N.Y., 1998.

The preparation of component (A) for use in accordance with the invention has no special features but instead takes place in a customary and known manner by mixing of the above-described constituents in appropriate mixing equipment such as stirred vessels, dissolvers, stirred mills or extruders.

Component (B) of the multicomponent system of the invention comprises at least one polyisocyanate (B1).

The polyisocyanates (B1) contain on average per molecule at least 2.0, preferably more than 2.0, and in particular more than 3.0 isocyanate groups. Basically, there is no upper limit on the number of isocyanate groups; in accordance with the invention, however, it is of advantage if the number does not exceed 15, preferably 12, with particular preference 10, with very particular preference 8.0, and in particular 6.0.

Examples of suitable polyisocyanates (B1) are isocyanato-containing polyurethane prepolymers which may be prepared by reacting polyols with an excess of diisocyanates and are preferably of low viscosity.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl) cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimeric fatty acids, as sold under the commercial designation DDI 1410 by the company Henkel and described in patents WO 97/49745 and WO 97/49747, especially 2-heptyl-3,4-bis(9-isocyanatononyl)-1-pentylcyclohexane, or 1,2-, 1,4- or 1,3-bis (isocyanatomethyl)cyclohexane, 1,2-, 1,4- or 1,3-bis(2-isocyanatoeth-1-yl)cyclohexane, 1,3-bis(3-isocyanatopropy-1-yl)cyclohexane, 1,2-, 1,4- or 1,3-bis(4-isocyanatobut-1-yl)cyclohexane or liquid bis(4-isocyanatocyclohexyl)methane with a trans/trans content of up to 30% by weight, preferably 25% by weight and in particular 20% by weight, as described in patent applications DE 44 14 032 A1, GB 1220717 A1, DE 16 18 795 A1 and DE 17 93 785 A1, preferably isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane or HDI, especially HDI.

It is also possible to use polyisocyanates (B1) containing isocyanurate, biuret, allophanate, iminooxadiazinedione, urethane, urea, carbodiimide and/or uretdione groups, which are prepared in a customary and known manner from the diisocyanates described above. Examples of suitable preparation techniques and polyisocyanates are known, for example, from patents CA 2,163,591 A, U.S. Pat. No. 4,419,513, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 and EP 0 531 820 A1.

The amount of the polyisocyanates (B1) in component (B) may vary widely. Primarily it is guided by the viscosity necessary for mixing with the other components. Preferably, the amount is from 20 to 80, more preferably from 30 to 70, and in particular from 35 to 65% by weight, based on component (B). Component (B) preferably further comprises at least one of the above-described organic solvents.

In accordance with the invention, component (A) and/or component (B) are mixed shortly prior to their mixing, before application, with at least one further liquid component (C).

Component (C) comprises at least one constituent (C1) which is curable with actinic radiation and contains on average per molecule at least two functional groups having at least one bond which can be activated with actinic radiation.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds ("double bonds"), are employed with preference.

Very suitable double bonds are present, for example, in (meth)acrylate, ethacrylate, crotonate, cinnamate, vinyl ether, vinyl ester, ethenylarylene, dicyclopentadienyl, norbornenyl, isoprenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

The constituent (C1) may be of low molecular mass, oligomeric or polymeric. Preferably it is of low molecular mass.

The basic structures of the oligo- or polymeric constituents (C1) are not critical, instead it is possible to use the basic structures described above for the constituent (A1).

Even the basic structures of the low molecular mass constituents (C1) are not critical but instead may derive from any of a wide variety of organic compound classes. Examples of suitable classes of compounds are alkyl, cycloalkyl, alkylcycloalkyl, cycloalkylalkyl, aryl, alkylaryl, cycloalkylaryl, arylalkyl and/or arylcycloalkyl compounds with or without heteroatoms such as oxygen, nitrogen, sulfur, silicon or phosphorus and optionally carrying further substituents which, however, must not react during the preparation of the constituents (C1), their storage and/or their use with the bonds which can be activated with actinic radiation.

Examples of suitable constituents (C1) are the reactive diluents curable with actinic radiation, as described for example in Römpp Lexikon Lacke und Druckfarben, Georg Thieme Verlag, Stuttgart, N.Y., 1998, on page 491 under the entry "Reactive diluents", or in column 7, lines 1 to 26 of DE 198 18 715 A1.

Particularly appropriate constituents (C1) are reactive diluents curable with actinic radiation and having at least 5, especially 5, of the above-described groups which can be activated with actinic radiation, especially acrylate groups. One example of such a reactive diluent (C1) is pentaerythritol pentaacrylate. These reactive diluents (C1), especially pentaerythritol pentaacrylate (C1), are not introduced by way of thixotropic agents.

The amount of the constituent (C1) in component (C) may vary widely, preferably it is from 30 to 90%, more preferably from 40 to 80%, and in particular from 50 to 70% by weight, based in each case on component (C). Furthermore, component (C) may further comprise at least one other of the additives described above, provided they do not react with the constituent (C1).

Component (C) containing the above-described constituent (C1) is preferably mixed with component (A), subsequent to which the resultant component (A/C) is mixed and homogenized with component (B) or with component (B/C).

Instead of the above-described constituent (C1) or in addition to it, component (C) comprises at least one constituent (C2).

The constituent (C2) comprises on average per molecule
 at least one, in particular at least two, of the above-described functional groups which can be activated with actinic radiation, and
 at least one, in particular at least two, of the above-described isocyanate-reactive functional groups, or
 at least one, especially at least two, isocyanate groups.
Examples of suitable basic structures for the constituents (C2) which contain at least one, in particular at least two, of the above-described isocyanate-reactive functional groups are the above-described low molecular mass, oligomeric and polymeric basic structures. Of these, the polyurethanes (C2) are of particular advantage and are therefore used with particular preference.

The preparation of polyurethanes (C2) having terminal and/or lateral double bonds has no special features in terms of its method but instead is described in detail in patent applications and patents DE 196 45 761 A, WO 98/10028, EP 0 742 239 A1, EP 0 661 321 B1, EP 0 608 021 B1, EP 0 447 998 B1, and EP 0 462 287 B1. Moreover, these constituents are commercially customary products and are sold, for example, under the brand name Rahn® 99-664 by the company Rahn.

In component (C), the amount of constituent (C2) may vary widely. Preferably, it is from 30 to 90, more preferably from 40 to 80, and in particular from 50 to 70% by weight, based in each case on component (C). Furthermore, the component (C) in question may also comprise at least one other of the above-described additives, provided they do not react with the constituent (C2).

Component (C) comprising the above-described constituent (C2) is mixed with component (A), subsequent to which the resultant component (A/C) is mixed and homogenized with component (B) or with component (B/C).

Instead of the above-described constituent (C2), component (C) may comprise at least one constituent (C2) containing isocyanate groups.

These constituents (C2) are, as is known, obtainable by reacting the above-described diisocyanates and polyisocyanates (B1) with compounds containing at least one, especially one, of the above-described isocyanate-reactive functional groups and at least one, especially one, bond which can be activated with actinic radiation. Examples of suitable compounds of this kind are 2-hydroxyethyl, 2-hydroxypropyl, 3-hydroxypropyl, 3-hydroxybutyl, 4-hydroxybutyl, bis(hydroxy-methyl) cyclohexane, neopentyl glycol, diethylene glycol, dipropylene glycol, dibutylene glycol, or triethylene glycol acrylate, methacrylate, ethacrylate, crotonate, cinnamate, vinyl ether, allyl ether, dicyclopentadienyl ether, norbornenyl ether, isoprenyl ether, isopropenyl ether or butenyl ether;

trimethylolpropane di-, glycerol di-, trimethylol-ethane di-, pentaerythritol tri- or homopenta-erythritol tri-acrylate, -methacrylate, -ethacrylate, -crotonate, -cinnamate, -vinyl ether, -allyl ether, -dicyclopentadienyl ether, -norbornenyl ether, -isoprenyl ether, -isopropenyl ether or -butenyl ether; or reaction products of cyclic esters, such as epsilon-caprolactone, for example, and the above-described hydroxyl-containing monomers; or 2-aminoethyl (meth)acrylate and/or 3-aminopropyl (meth)acrylate.

Viewed in terms of its method, the preparation of these constituents (C2) has no special features but instead takes place as described, for example, in European Patent Application EP 0 928 800 A1.

The amount of this constituent (C2) in component (C) may vary widely. Preferably it is from 60 to 95, more preferably from 70 to 95, and in particular from 75 to 85% by weight, based in each case on component (C). Furthermore, component (C) in question may also comprise at least one of the above-described additives, provided these do not react with isocyanate groups (C2).

Component (C) containing the isocyanato-containing constituent (C2) is mixed and homogenized with component (B), subsequent to which the resultant component (B/C) is mixed and homogenized with component (A) or with component (A/C).

Viewed in terms of its method, the mixing of components (A/C) and (B), (A) and (B/C) or (A/C) and (B/C) has no special features but instead is conducted with the aid of the customary and known, above-described mixing apparatus and mixing processes or by means of customary two-component or multicomponent metering and mixing equipment. Ideally, mixing takes place by hand, where the viscosity of the components permits.

The volume ratio of components (A):(C) in the process of the invention may vary widely. If component (C) exclusively is added to component (B), this ratio may be mathematically infinite. Otherwise, the ratio (A):(C) is preferably from 2:1 to 1:2, preferably from 1.5:1 to 1:1.5, and in particular from 1.2:1 to 1:1.2.

The volume ratio of components (B):(C) in the process of the invention may likewise vary very widely. If component (C) exclusively is added to component (A), this ratio may be mathematically infinite. Otherwise, the ratio (B):(C) is preferably from 2:1 to 1:2, preferably from 1.5:1 to 1:1.5, and in particular from 1.2:1 to 1:1.2.

Furthermore, it is possible for the volume ratio of components (A):(B/C), (A/C):(B) or (A/C):(B/C) in the process of the invention to vary very widely. Preferably these ratios are from 5:1 to 1:5, preferably from 4:1 to 1:4, and in particular from 3:1 to 1:3.

The matter of which volume ratios are employed is guided primarily by the functionality and concentration of the above-described reactive constituents of the components. The skilled worker will therefore easily be able to determine the optimum volume ratio for each specific case, on the basis of his or her knowledge in the art, possibly with the assistance of simple rangefinding tests.

It is a very particular advantage of the process of the invention that it can be used, starting from a conventional, thermally curable multicomponent system, to prepare dual-cure multicomponent systems in a simple manner when the need suddenly arises, these systems being of very different material composition and functionality.

The dual-cure multicomponent systems prepared with the aid of the process of the invention, especially the multicomponent system of the invention, comprising at least one, especially one, component (A) comprising at least one of the above-described constituents (A1), at least one, especially one, component (B) comprising at least one of the above-described polyisocyanates (B1), and at least one, especially one, component (C) comprising at least one of the above-described reactive diluents (C1) containing at least 5 bonds per molecule which can be activated with actinic radiation, the reactive diluent (C1) not being introduced by way of a thixotropic agent, may therefore be put to a very wide variety of end uses. They are preferably used as coating materials, adhesives and sealing compounds.

The coating materials, adhesives and sealing compounds are used to produce coats, adhesive films and seals on and/or in primed and unprimed substrates. In particular, the coating materials are used to produce clearcoats, especially clearcoats in multicoat color and/or effect coating systems.

In terms of method, the application of the clearcoat materials has no special features but instead may take place by any customary application method, such as spraying, knifecoating, brushing, flowcoating, dipping, trickling or rolling, for example. It is preferred to employ spray application methods, such as compressed air spraying, airless spraying, high-speed rotation, electrostatic spray application (ESTA), alone or in conjunction with hot spray applications such as hot-air spraying, for example.

Suitable substrates are surfaces which are not damaged by curing of the coating materials, adhesives and/or sealing compounds present thereon using heat and actinic radiation; examples are metals, plastics, wood, ceramic, stone, textile, fiber composites, leather, glass, glass fibers, glass wool, rockwool, mineral-bound and resin-bound building materials, such as plasterboard and cement slabs or roof tiles, and also assemblies of these materials.

Accordingly, the coating materials, adhesives and sealing compounds are also suitable for applications outside of automotive OEM finishing and automotive refinishing. In this context they are particularly suitable for the coating, bonding and/or sealing of furniture, windows, doors, constructions in the interior and exterior sector, and for industrial coating, including coil coating, container coating and the impregnation or coating of electrical components. In the context of industrial coatings, they are suitable for coating, bonding and/or sealing virtually all parts for private or industrial use, such as radiators, domestic appliances, small metal parts such as nuts and bolts, hub caps, wheel rims, packaging, or electrical components such as motor windings or transformer windings.

In the case of electrically conductive substrates, it is possible to use primers which are produced in a customary and known manner from the electrodeposition coating materials. Both anodic and cathodic electrodeposition coating materials are suitable for this purpose, but especially cathodic coating materials.

The electrodeposition coat or electrodeposition coating film may be overcoated with a surfacer, which is cured either alone or together with the electrodeposition coating film (wet-on-wet technique). Overcoating with a surfacer takes place in particular in the regions exposed to severe mechanical stress, such as by stonechipping, for example.

Examples of suitable cathodic electrodeposition coating materials and, where appropriate, of wet-on-wet techniques are described in Japanese patent application 1975-142501 (Japanese laid-open specification JP 52-065534 A2, Chemical Abstracts No. 87: 137427) or in patents and patent applications U.S. Pat. No. 4,375,498 A, U.S. Pat. No. 4,537,926 A, U.S. Pat. No. 4,761,212 A, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

Similarly, appropriate surfacers, especially aqueous surfacers, which are also referred to as antistonechip primers or functional coats, are known from patents and patent applications U.S. Pat. No. 4,537,926 A, EP 0 529 335 A1, EP 0 595 186 A1, EP 0 639 660 A1, DE 44 38 504 A1, DE 43 37 961 A1, WO 89/10387, U.S. Pat. No. 4,450,200 A, U.S. Pat. No. 4,614,683 A or WO 490/26827.

It is also possible to coat, bond or seal primed or unprimed plastics parts made, for example, from ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728T1). Unfunctionalized and/or nonpolar substrate surfaces may be subjected prior to coating in a known manner to a pretreatment, such as by plasma or by flaming, or may be provided with a primer.

To produce the clearcoats, the clearcoat materials are applied to the substrates described above, after which the resulting clearcoat films are cured.

To produce the adhesive films and seals, the adhesives and sealing compounds are applied on and/or in the above-described substrates. In the case of the bonding of substrates, the surfaces of two or more substrates that are to be bonded are preferably coated with the adhesive of the invention, after which the surfaces in question are brought into contact, under pressure if appropriate, and the resultant adhesive films are cured.

As is known, the production of a multicoat color and/or effect coating system on a primed or unprimed substrate takes place by (1) applying a basecoat material to the substrate,
(2) drying and/or partly or fully curing the basecoat film,
(3) applying a clearcoat material to the dried and/or partly cured basecoat film or to the cured basecoat, and
(4) conjointly curing the clearcoat film with the basecoat film, or separately curing the clearcoat film.

Examples of suitable basecoat materials are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, and EP 0 817 684, column 5, lines 31 to 45.

In general, the surfacer film, topcoat film, basecoat film and clearcoat film are applied in a wet film thickness such that curing thereof results in coats having the film thicknesses advantageous and necessary for their functions. In the case of the surfacer film this film thickness is from 10 to 150, preferably from 15 to 120, with particular preference from 20 to 100, and in particular from 25 to 90 $\mu$m, in the case of the topcoat the film thickness is from 5 to 90, preferably from 10 to 80, with particular preference from 15 to 60, and in particular from 20 to 50 $\mu$m, in the basecoat case it is 5 to 50, preferably 6 to 40, especially preferably 7 to 30 and in particular 8 to 25 $\mu$m, and in the case of the clearcoats it is from 10 to 100, preferably from 15 to 90, with particular preference from 20 to 80, and in particular from 25 to 70 $\mu$m.

The complete curing takes place after a certain flash-off time. This is used, for example, for leveling and for the degassing of the applied films or for the evaporation of volatile constituents such as solvents or water. The flash-off time may be assisted and/or shortened by the use of elevated temperatures up to 40° C. and/or by blowing on the films, provided this does not entail any damage or alteration to the applied films, such as premature complete crosslinking, for example. The clearcoats of the invention have an advantageously short flash-off time, in this case, of <10, especially <6 minutes. This produces a shortening in the process times overall.

The curing takes place with actinic radiation, especially with UV radiation, and/or electron beams. If desired, it may be supplemented by or carried out with actinic radiation from other radiation sources. In the case of electron beams, it is preferred to operate under an inert gas atmosphere. This may be ensured, for example, by supplying carbon dioxide and/or nitrogen directly to the surface of the applied films.

In the case of curing with UV radiation as well it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 405 nm, or electron beam sources. Their arrangement is known in principle and may be adapted to the circumstances of the workpiece and the process parameters. In the case of workpieces of complex shape such as automobile bodies, the regions not accessible by direct radiation (shadow regions) such as cavities, folds and other structural undercuts may be cured using point, small-area or all-round sources, in conjunction with an automatic movement device for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

The cure may be effected in stages, i.e., by multiple exposure to light or actinic radiation. This can also be done alternatingly, i.e., by curing in alternation with UV radiation and electron beams.

Thermal curing as well has no special features in terms of method but instead takes place in accordance with the customary and known methods such as heating in a forced air oven or irradiation with IR lamps. As for curing with actinic radiation, thermal curing may also take place in stages. Thermal curing is preferably effected at room temperature or above room temperature, preferably at temperatures >40° C., preferably >50° C., for a period of from one minute to several days.

Thermal curing and curing with actinic radiation may be used simultaneously or in alternation. Where the two curing methods are used in alternation, it is possible, for example, to commence with thermal curing and end with actinic radiation curing. In other cases, it may prove advantageous to commence and to end with actinic radiation curing. The skilled worker is able to determine the curing method which is most advantageous for the particular case in hand, on the basis of his general knowledge of the art with the assistance, if appropriate, of simple preliminary tests.

The coating materials, adhesives and sealing compounds prepared by means of the process of the invention, and also the coating materials, adhesives and sealing compounds of the invention based on the multicomponent system of the invention, have a high solids content at low viscosity and a long stand time.

The flash-off time of the dual-cure multicomponent systems, especially of the clearcoat material, before curing is very short, so that the process times overall are reduced.

The coats, adhesive films and seals produced using the dual-cure multicomponent systems, especially the clearcoats, have a high initial hardness even in the shadow regions of the substrates.

The resulting coatings, especially the clearcoats and the multicoat color and/or effect coating systems comprising them, are of high hardness, flexibility and chemical resistance, possess outstanding leveling, no runs, very good intercoat adhesion, an outstanding overall appearance, very good weathering stability, very high scratch resistance and abrasion resistance, and also very good polishability.

The adhesive films are of high and long-term bond strength even under extreme and/or very sharply and rapidly changing climatic conditions.

The seals provide long-term and complete sealing against chemically aggressive substances.

Accordingly, the primed and unprimed substrates coated with at least one of the coats, bonded with at least one of the adhesive films, and/or sealed with at least one of the seals possess, in addition to the advantages set out above, a particularly long service life as well, which make them particularly valuable from an economic standpoint.

EXAMPLES

Preparation Example 1

The Preparation of a Thermally Curable Methacrylate Copolymer

A steel reactor equipped with stirrer, reflux condenser and two feed vessels was charged with 185.6 parts by weight of ethyl epoxypropionate and this initial charge was heated with stirring to 160° C. Subsequently, a monomer mixture of 114.1 parts by weight of styrene, 136.9 parts by weight of methyl methacrylate, 79.3 parts by weight of butyl methacrylate, 109 parts by weight of n-butyl acrylate and 164.1 parts by weight of hydroxyethyl methacrylate was metered in at a uniform rate over the course of four hours. Beginning at the same time and in parallel with this monomer mixture, an initiator mixture of 35.8 parts by weight of ethyl ethoxypropionate and 36.2 parts by weight of di-tert-butyl peroxide was metered in at a uniform rate. After one hour, initiation was repeated at 110° C. with an initiator mixture of 5.7 parts by weight of butyl acetate and 0.5 parts by weight of tert-butyl peroxyethylhexanoate. Subsequently, the resultant reaction mixture was held at 110° C. for one hour. Thereafter, at 80° C., the solution was adjusted to a solids content of 65% by weight using butyl acetate. The resultant solution had a viscosity of 15 dPas. The hydroxyl number of the methacrylate copolymer was 120 mg KOH/g.

Examples 1 to 4

The Preparation of Clearcoat Materials by the Process of the Invention and their Use to Produce Multicoat Color and Effect Coating Systems The clearcoat materials 1 to 4 of examples 1 to 4 were prepared by mixing the components stated in table 1.

For this purpose, in the case of example 1, components (A), (B) and (C/C1) were mixed with one another in a volume ratio of 2:1:2, component (C/C1) being mixed prior to the addition of (B) with component (A).

In the case of example 2, components (A), (B) and (C/C2) were mixed with one another in a volume ratio of 1:1:1, component (C/C2) being mixed prior to the addition of (B) with component (A).

In the case of example 3, components (A), (B) and (C/C2) were mixed with one another in a volume ratio of 4:1:1, component (C/C2) being mixed prior to the addition of (A) with component (B).

In the case of example 4, components (A), (B) and (C/C2 without isocyanate groups) and (C/C2 with isocyanate groups) were mixed with one another in a volume ratio of 2:2:1:1, component (C/C2 without isocyanate groups) having been mixed with component (A) and the component (C/C2 with isocyanate groups) with component (B), after which the resulting components (A/C) and (B/C) were mixed with one another and homogenized.

Subsequently, the clearcoat materials 1 to 4 of examples 1 to 4 were diluted with 10%, based on the clearcoat materials, of a diluent (solvent mixture of xylene, solvent naphtha, mineral spirit 135/180, methoxypropyl acetate, butyl acetate, butyl glycol acetate, ethyl ethoxypropionate and dipentenes).

TABLE 1

The material composition of components (A), (B) and (C) of the clearcoat materials 1 to 4

| Constituent | Clearcoat - example: | | | |
|---|---|---|---|---|
| | 1 | 2 | 3 | 4 |
| Component (A): | | | | |
| Methacrylate copolymer of preparation example 1 | 86 | 86 | 86 | 86 |
| Butyl acetate | 4.5 | 4.5 | 4.5 | 4.5 |
| Ethyl ethoxypropionate | 4 | 4 | 4 | 4 |
| Methyl isoamyl ketone | 2 | 2 | 2 | 2 |
| Byk ® 325[a] | 0.3 | 0.3 | 0.3 | 0.3 |
| Byk ® 358[a] | 0.71 | 0.7 | 0.7 | 0.7 |
| Dibutyltin dilaurate (10% in butyl acetate) | 0.5 | 0.5 | 0.5 | 0.5 |
| Tinuvin ® 292[b] | 1 | 1 | 1 | 1 |
| Tinuvin ® 400[b] | 1 | 1 | 1 | 1 |
| Component (B): | | | | |
| Desmodur ® N3600[c] | 56 | 56 | 56 | 56 |
| Methoxypropyl acetate | 22 | 22 | 22 | 22 |
| Ethyl ethoxypropionate | 22 | 22 | 22 | 22 |
| Component (C): | | | | |
| Component (C1): | | | | |
| Sartomer ® 399[d] | 60 | — | — | — |
| Irgacure ® 184[e] | 0.7 | — | — | — |
| Lucirin ® TPO[e] | 0.3 | — | — | — |
| Butyl acetate | 16 | — | — | — |
| Ethylethoxypropionate | 16 | — | — | — |
| Methyl isoamyl ketone | 5 | — | — | — |
| Byk ® 325 | 0.3 | — | — | — |
| Byk ® 358 | 0.7 | — | — | — |
| Tinuvin ® 292 | 0.5 | — | — | — |
| Tinuvin ® 400 | 0.5 | — | — | — |
| Component (C2) without isocyanate groups: | | | | |
| Rahn ® 99-664[f] | — | 60 | — | 60 |
| Irgacure ® 184 | — | 0.7 | — | 0.7 |
| Lucirin ® TPO | — | 0.3 | — | 0.3 |
| Butyl acetate | — | 16 | — | 16 |
| Ethylethoxypropionate | — | 16 | — | 16 |
| Methyl isoamyl ketone | — | 5 | — | 5 |
| Byk ® 325 | — | 0.3 | — | 0.3 |
| Byk ® 358 | — | 0.7 | — | 0.7 |
| Tinuvin ® 292 | — | 0.5 | — | 0.5 |
| Tinuvin ® 400 | — | 0.5 | — | 0.5 |
| Component (C2) with isocyanate groups: | | | | |
| Roskydal ® 2337[g] | — | — | 80 | 80 |
| Ethyl ethoxypropionate | — | — | 20 | 20 |

[a] commercially customary leveling agents;
[b] commercially customary light stabilizers;
[c] commercially customary polyisocyanate based on hexamethylene diisocyanate, from Bayer AG;
[d] dipentaerythritol pentaacrylate from Cray Valley;
[e] commercially customary photoinitiators;
[f] commercially customary urethane acrylate from Rahn; hydroxyl number: 120 mg KOH/g; acrylate functionality: 3;
[g] commercially customary isocyanato acrylate from Bayer AG.

Despite very different material composition, the clearcoat materials of examples 1 to 4 were outstandingly suitable for the production of clearcoats, especially as part of multicoat color and effect coating systems.

To produce the multicoat color and effect coating systems, sanded steel panels were first of all coated with a commercially customary two-component polyurethane surfacer from BASF Coatings AG. The surfacer was applied in two spray passes, dried at 60° C. for 30 minutes and then sanded. Subsequently, a commercially customary aqueous basecoat material from BASF Coatings AG was applied in two spray passes and dried at 60° C. for 5 minutes. Thereafter, the clearcoat materials 1 to 4 were applied each in two spray passes with a flash-off time of 2.5 minutes in between.

The applied clearcoat films 1 to 4 were each flashed off briefly for 5 minutes, dried at 60° C. for 15 minutes, and then cured using UV radiation with a dose of 1500 mJ/cm$^2$. The resultant clearcoats 1 to 4 had a film thickness of from 50 to 60 μm. The multicoat systems of examples 1 to 4 had an outstanding appearance and intercoat adhesion.

In a second series of tests, the cure behavior of the clearcoat materials 1 to 4 in shadow zones of substrates was simulated by not curing the above-described test panels using UV radiation. Nevertheless, the resultant clearcoats were not tacky, but instead had a good initial hardness.

What is claimed is:

1. A process for preparing a multicomponent system curable thermally and with actinic radiation, comprising
    I) at least one of
        a) premixing at least one liquid component (C) with a component (A) to form a mixture A/C, and/or
        b) premixing the at least one liquid component (C) with a component (B) to form a mixture B/C, and
    II) mixing and homogenizing one of
        i) mixture A/C with component (B),
        ii) mixture B/C with component (A), or
        iii) mixture A/C with mixture B/C,
    wherein
        component (A) comprises at least one constituent (A1) comprising per molecule on average at least two isocyanate-reactive functional groups,
        component (B) comprises at least one component comprising at least one polyisocyanate (B1),
        component (C) comprises
        (C1) constituent (C1) comprising per molecule on average at least two functional groups comprising at least one bond activated by actinic radiation, and
        (C2) constituent (C2) different from constituent (C1) comprising on average per molecule at least one functional group comprising at least one bond activated by actinic radiation, and on average per molecule at least one isocyanate-reactive functional group or at least one isocyanate group.

2. The process of claim 1, wherein the bonds activated with actinic radiation are selected from the group consisting of carbon-hydrogen single bonds, carbon-carbon double bonds, carbon-carbon single bonds, carbon-oxygen double bonds, carbon-oxygen single bonds, carbon-nitrogen single bonds, carbon-nitrogen double bonds, carbon-phosphorus single bonds, carbon-phosphorus double bonds, carbon-silicon single bonds, carbon-single double bonds, and mixtures thereof.

3. The process of claim 2, wherein the bonds activated by actinic radiation are carbon-carbon double bonds.

4. The process of claim 1, wherein the functional groups comprising at least one bond activated by actinic radication are selected from the group consisting of (meth)acrylate, ethacrylate, crotonate, cinnamate, vinyl ether, vinyl ester, ethenylarylene, dicyclopentadienyl, norbornenyl, isoprenyl, isopropenyl, allyl, butenyl, ethenylarylene ether, dicyclopentadienyl ether, norbornenyl ether, isoprenyl ether, isopropenyl ether, allyl ether, butenyl ether, ethenylarylene ester, dicyclopentadienyl ester, norbornenyl ester, isoprenyl ester, isopropenyl ester, allyl ester, and butenyl ester.

5. The process of claim 1, wherein the isocyanate-reactive functional groups are selected from the group consisting of thiol, primary amino, secondary amino, imino, hydroxyl groups and mixtures thereof.

6. The process claim 1, wherein constituent (C1) is a reactive diluent curable with actinic radiation and comprising per molecule at least 5 bonds activated by actinic radiation.

7. The process of claim 1, wherein constituent (C2) comprises at least one urethane acrylate having a hydroxyl number of from 50 to 200 mg KOH/g.

8. The process of claim 7, wherein the urethane acrylate (C2) is admixed with component (A).

9. The process of claim 1, wherein the constituent (C2) comprises an isocyanate acrylate.

10. The process of claim 9, wherein the isocyanate acrylate (C2) is admixed with component (B).

11. A multicomponent system curable thermally and with actinic radiation, comprising (A) at least one component comprising at least one thermally curable constituent (A1) containing per molecule on average at least two isocyanate-reactive functional groups, (B) at least one component containing at least one polyisocyanate (B1), and (C) a compound (C) comprising at least one reactive diluent curable with actinic radiation and comprising per molecule at least 5 bonds activatable by actinic radiation, the reactive diluent (C1) not being introduced by way of thixotropic agent, and a least one constituent (C2) different from the at least one reactive diluent (C1) comprising on average per molecule at least one functional group comprising at least one bond activatable by actinic radiation, and on average per molecule at least one isocyanate-reactive functional group or at least one isocyanate group.

12. The multicomponent system of claim 11, wherein reactive diluent (C) comprises dipentaerythritol pentaacrylate.

13. The multicomponent system of claim 11, wherein the isocyanate reactive functional group comprise hydroxyl groups.

14. The multicomponent system of claim 11, wherein constituent (A) comprises at least one (meth)acrylate copolymer having a hydroxyl number of from 50 to 200 mg KOH/g.

15. The multicomponent system of claim 11 made by the process of claim 1 which is a coating material, adhesive or sealing compound.

16. A method of making a coated substrate, comprising applying the multicomponent system of claim 11 to a substrate selected from the group consisting of automotive OEM finishing substrates, automotive refinishing substrates, furniture substrates, door substrates, window substrates, interior substrates, exterior substrates, industrial coating substrates, coil coating substrates, container coating substrates, f electrical components substrates.

17. The method of claim 16, wherein the multicomponent system is applied wet-on-wet and the coated substrate has a colored or effect appearance.

18. The process of claim 1, wherein constituent (C1) is present in compound (C) in an amount from 30% to 90% by weight, and constituent (C2) is present in compound (C) in an amount from 60% to 95% by weight.

19. The multicomponent system of claim 11, wherein the reactive diluent is present in compound (C) in an amount from 30% to 90% by weight, and constituent (C2) is present in compound (C) in an amount from 60% to 95% by weight.

* * * * *